United States Patent [19]
Reuter et al.

[11] Patent Number: 5,900,691
[45] Date of Patent: May 4, 1999

[54] PIEZOELECTRICALLY ACTUATED DRIVING AND ADJUSTING ELEMENT

[75] Inventors: Martin Reuter, Dachau; Konrad Voigt, Bad Klosterlausnitz, both of Germany

[73] Assignee: marco Systemanalyse und Entwicklung GmbH, Dachau, Germany

[21] Appl. No.: 08/849,556

[22] PCT Filed: Dec. 16, 1995

[86] PCT No.: PCT/EP95/04991

§ 371 Date: Jun. 4, 1997

§ 102(e) Date: Jun. 4, 1997

[87] PCT Pub. No.: WO96/19836

PCT Pub. Date: Jun. 27, 1996

[30] Foreign Application Priority Data

Dec. 21, 1994 [DE] Germany .................. 44 45 642

[51] Int. Cl.$^6$ ..................................... H01L 41/12
[52] U.S. Cl. ................. 310/348; 310/328; 310/323
[58] Field of Search .................... 310/328, 323, 310/348

[56] References Cited

U.S. PATENT DOCUMENTS

| | | | |
|---|---|---|---|
| 3,614,486 | 10/1971 | Smiley | 310/323 |
| 5,079,471 | 1/1992 | Nygren, Jr. | 310/328 |
| 5,328,149 | 7/1994 | Reuter | 251/129.06 |
| 5,448,662 | 9/1995 | Kittell et al. | 385/25 |

FOREIGN PATENT DOCUMENTS

536832 A1 4/1993 European Pat. Off. .
574945 A1 12/1993 European Pat. Off. .

OTHER PUBLICATIONS

Patent Abstracts of Japan, vol. 012 No. 158 (E–608), May 13, 1988 & JP, A, 62–272575 (Matsushita Electric Works Ltd) Nov. 26, 1987, see abstract.

Patent Abstracts of Japan, vol. 018 No. 382 (E–1580), Jul. 19, 1994 & JP, A, 06 105569 (Olympus Optical Co Ltd) Apr. 15, 1994, see abstract.

Refer to company brochure of the firm Physik Instruments, Waldbronn, 1994.

*Primary Examiner*—Mark O. Budd
*Assistant Examiner*—Timothy A. Williams
*Attorney, Agent, or Firm*—Jordan and Hamburg

[57] ABSTRACT

A piezoelectrically actuated driving and adjusting apparatus transmits both pure translation movements and rotation movements. The object of the present invention is to provide a piezoelectrically actuated driving and adjusting apparatus having a simple, compact and robust mechanical structure, capable of ensuring long adjustment paths and suitable for various adjustment and drive tasks using the same principle structure. Two parallel stacks of piezoelectric elements are arranged as close as possible to each other. The piezoelectric stacks are supported at first front surfaces on a crossbar by a tiltable coupling. Second front surfaces of the piezoelectric stacks, opposite to the first front surfaces, lie flat on a stiff common member that rigidly interconnects both the piezoelectric stacks. A biasing apparatus is provided to apply a symmetrical, predefinable force on the piezoelectric stacks by acting on the crossbar and the common member. Hinge devices allow opposite groups of components to be deflected, tilted and/or lifted in relation to each other when temporally offset and variable electric voltages are applied to the piezoelectric stacks.

24 Claims, 6 Drawing Sheets

PIEZOELECTRICALLY ACTUATED DRIVING AND ADJUSTING ELEMENT

BACKGROUND OF THE INVENTION

The invention relates to a piezoelectrically actuated drive and adjustment element for transmitting pure translatory movements as well as rotational movements.

Piezoelectric drive and displacement means are known. In its simplest form, a piezoelectric element abuts against a non-displaceable support and pushes against a displaceable element. When an electric voltage is applied across the piezoelectric element it expands, displacing the displaceable element. Such setups are known in a number of varieties and transmit comparatively small variations in length of piezoelectric element by lever arrangements. The variations in length are not greater than 20–30 μm at a maximum permissible excitation voltage even when individual elements are employed to form stacks with an overall height on an order of size of 20 mm. Such arrangements are used as precision drives, for example, in adjustment operations (refer to company brochure of the firm Physik Instruments, Waldbronn, 1994). Such arrangements, particularly when incorporated in devices, are disadvantageous because the piezoelectric element always has to operate against the lever structure and respective reset means and the piezoelectric element itself is subject to length variations due to varying influences of force and temperature. In particular, different thermal coefficients of expansion of the piezoelectric material and the material of a remainder of the device, such as steel, are disadvantageous. To compensate for such effects, the displacement element, when subject to temperature variations, is readjusted or is automatically regulated by means of a sensitive position measuring system which deteriorates displacement ranges available. Such measures also require considerable additional expenditures.

Furthermore, the above arrangements have a low internal rigidity due to the resetting means so that they only work quasi-statically at low response times.

Furthermore, units including piezoelectric elements are known which, by addition of single steps, obtain large displacement ranges (refer to: Müller, F. "Entwicklung eines piezoelektrischen StoBantriebs mit ausgeprägter Klemmung", Univ. Diss., Dresden, 1989; Roscher, H. J. "Zur optimalen Gestaltung selbständiger piezoelektrischen Stellantriebe mit magnetischer Klemmung für Mikropositioniereinrichtungen". TH Diss. Karl-Marx-Stadt, 1980). In a so-called "inch-worm" device, at least three independently working piezoelectric elements are stacked to form one unit which, depending on the electrical excitation, differently contract or expand so that the unit performs movements or transmits movements to an element to be driven. Apart from a comparatively difficult setup, such units exhibit additional disadvantages. The individual step widths obtainable are comparatively small, about only 20 μm. Furthermore, as concerns temperature variations, such devices do not have inherent compensation means. Although such devices ensure comparatively high clamping forces, a comparatively high operational wear results.

A further known basic modification of driving units which include piezoelectric elements provides the so-called impact drives which are embodied as flexure elements comprising two piezoelectric sheets to which opposite A.C. voltages are applied so that the points of action of these elements perform elliptic movements which act upon a drive means to initiate, for example, rotational movements of the latter. Particularly, when a plurality of such elements are employed, surprisingly high rotational speeds are obtained in some cases, however, only low rotational moments and forces, respectively, can be transmitted. Apart from low resonant frequencies, these elements also show a high wear.

The EP 0 574 945 A1 publication discloses a device for actuating a valve element which obviates the abovementioned problem of self-compensation for temperature variations by employing two piezoelectric stacks, each of which operates an actuation lever of a valve. This arrangement produces tilting movements and/or lifts on both arms connected to the stacks via respective fulcrums. In operation, the piezoelectric stack elements substantially perform free movements wherein rotational and tilting movements superimpose. This construction exhibits poor rigidity with respect to external forces and requires additional supports.

SUMMARY OF THE INVENTION

It is an object of the present invention to provide a piezoelectrically actuated driving and displacement element which overcomes the disadvantages of the prior art, exhibits a simple, compact, and very rigid structure that ensures long displacement paths and high reaction speeds and can be utilized for varied drive and displacement tasks with, in principle, a common configuration.

A basic feature of the present invention includes pre-tensioning by a symmetrical force on two stacks of piezoelectric material, and in particular, a piezoceramic material mounted in such a manner that, when an electric voltage is applied, the stacks are subject to a definite variation in length, while the symmetrical pre-tensioning force is maintained. It is feasible to transmit the variation in length with a high transmission rate and a high force.

BRIEF DESCRIPTION OF THE DRAWINGS

The present invention will be explained in more detail by reference ten embodiments illustrated in the drawings in which there is shown in.

DETAILED DESCRIPTION OF THE INVENTION

Figure 1:
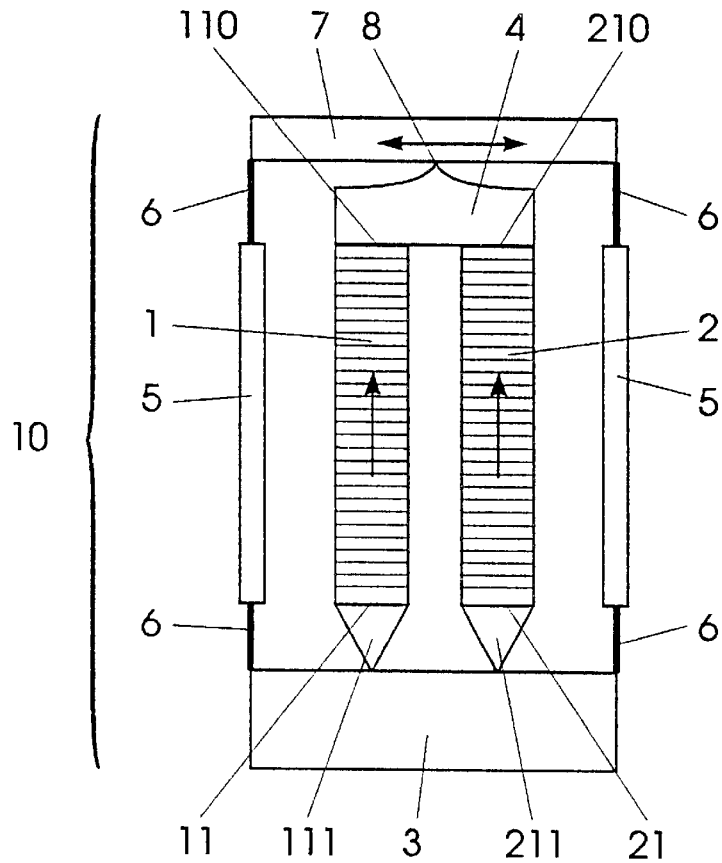
FIG. 1, a schematic view of an embodiment of a pure translatory actuator according to the present invention.

Referring to FIG. 1, an actuator 10, of an embodiment of the present invention, is represented in a position of rest and has two piezoceramic units in the form of piezoelectric stacks 1 and 2 arranged at a space of 1 mm in parallel to one another. First leading faces, 11 and 21, of each piezoelectric stack 1, 2, abut against an arm 3 via tiltable connections 111 and 211, respectively, which in the present example are embodied as solid state joints tiltable in one dimension. Second leading faces 110 and 210 of the piezoelectric stacks are commonly mounted on a rigid cross bar 4, upon which the second leading faces 111 and 211 are flatly and rigidly seated. In the present example, the cross bar 4 is provided with a solid state joint 8 arranged between axes of the piezoelectric stacks 1, 2. The units are clamped within a solid state parallelogram constituted of the arm 3, a further arm 7, and side members 5, 6 connecting the former with one another on both sides.

Furthermore, it lies within the scope of the present invention to realize the clamping of and the symmetrical admission of force to the two piezoelectric stacks 1, 2 via a not shown tension tie arranged symmetrically to the piezoelectric stacks 1, 2. In the present example, the members 6 are embodied as solid state joints. It is feasible to provide the pre-tensioning means 5 acting in parallel to the stack axes with, for example, screws or the like which permit a defined setting of the pre-tensioning force which should lie in an order of size of 20 to 25 N/mm$^2$. The screws or the like are not shown in detail since the absolute size of the pre-tensioning force does not further concern the basic function of the present invention.

When the piezoceramic stacks 1, 2 are subject to electric voltages differing from one another, the results are likewise differing expansions and contractions, respectively, of the piezoelectric stacks 1, 2 along their axes indicated by the arrows. This leads to a slight tilting of the piezoelectric stacks 1, 2 which, in turn, are operationally connected to the arm 7 via the solid state joint 8 of the common cross-bar 4 and, hence, a lateral displacement of the solid state parallelogram (indicated by a double arrow) results, enabled by the solid state joints 6. In this manner, it is feasible to transmit lateral displacements of the solid state parallelogram on an order of size of 200–250 μm, with piezoceramic stacks of about 20 mm height which, at a maximum voltage applied, still have a variation of length of only 20 μm to 30 μm.

The principle advantages of the embodiments described above and below include:

(1) self-compensation with respect to temperature variations due to the use of two piezoelectric stacks 1, 2;

(2) no work against the arms 3 and 7 or any other pre-tensioning means has to be performed when the piezoelectric stacks 1, 2 are electrically loaded for push-pull operation so that the pre-tension can be conceived very stiff with such operation;

(3) obtaining great deflections at a simultaneously defined and precise setting of an absolute deflection;

(4) a defined active resetting (and opposite deflection in the other direction, respectively) of the device without any additional external force applied, when electrically exciting the piezoelectric stacks 1, 2 in push-pull operation; and (5) obtaining extremely short setting times (about 1 msec.) without any overshoot or resonance effects.

Figure 2:
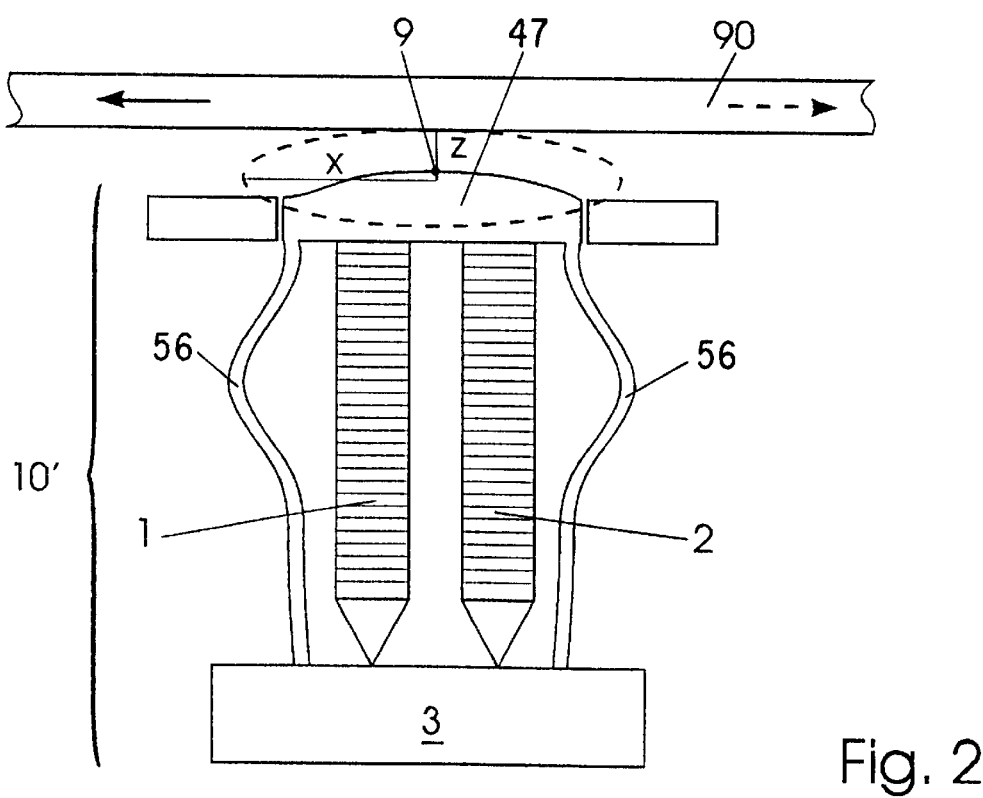
FIG. 2, a schematic view of an embodiment of drive-element for step drives according to the present invention.

Referring to FIG. 2, a drive actuator 10' of a second embodiment of the present invention has the two piezoceramic stacks 1, 2 tensioned between the arm 3 and a common rigid cross-bar 47. The cross-bar 47 has a convex surface for engaging a face of a driven member 90. The convex surface exemplifies a particular embodiment, but is not a limiting shape in any further application. In contrast to FIG. 1, the force symmetrically applied to both piezoelectric stacks 1, 2 is realized by spring means symmetrically enclosing the piezoelectric stacks 1, 2. In the present example, the spring means include deflectable spring members 55 which perform the function of the solid state joints 6 and the pre-tensioning members 5 (as in FIG. 1) rather than exerting a force on the piezoelectric stacks 1, 2 via joint connections to the cross-bar 4 and to the arm 3.

An electric voltage drive in analogy to that applied to drive actuator 10 of FIG. 1 is also feasible. In the present case, however, it is of particular significance that the two piezoelectric stacks 1, 2 are electrically driven by sine wave voltages having a selectable phase-shift of, for example, 90°. The movement which a culmination point 9 of the cross-bar 47 performs becomes more complicated in the present case in that it follows an elliptic movement indicated by a dashed line. Additionally a non-transmitted equally directed variation of length of the piezoelectric stacks 1, 2 is effective in a direction of a minor half-axis z. Though the lift is small in this direction it is feasible to transmit great powers. The size of the lift in z-direction is affected by a characteristic curve of the spring members 56. The lower the rigidity of the same, the longer is the lift obtainable in this direction which is only limited by a maximum expansion of the piezoelectric stacks 1, 2. Such an embodiment and operation is particularly suitable for applications in stepper motors. When the cross-bar 47, in a phase of equally directed expansion in an x-direction, is forced against a translatory moveable counter face of the driven member 90, a force-locked coupling is obtained then, in a subsequent phase, the driven member 90 is displaced in the x-direction by a lever-transmitted deflection of the culmination point 9. When the piezoelectric stacks 1, 2 are in a contraction phase, the coupling is disconnected and the cross-bar 47 freely moves back until a new forced-locked coupling takes place. When the piezoelectric stacks 1, 2 have a typical length of 20 mm, lifts of about 15 μm are obtained in z-direction and deflections of about 200 μm are effected in the x-direction. When the expansion of the piezoelectric stacks 1, 2 in the clamping direction is limited by engaging the counter face of the driven member 90, a high clamping force results due to the inherent rigidity of the piezoelectric stacks 1, 2. When, as shown in the present example, the cross-bar 47 has a spherical surface, or is additionally provided with one, then it is feasible to establish a line-shaped coupling with the counter-face of the driven member 90 which requires low expenditures for adjustment. Thus, particularly low operational wear is ensured. It is feasible to operate such a drive at 1 kHz so that advancement rates of at least 100 mm/sec are attainable. By setting the phase angle between 0° and 180°. The amplitude of movement and, hence, the step width can be continuously set in the range of 0–200 μm so that the effect of a continuously operating gear is realized. Phase angles between 180° and 360° produce respective steps in reverse direction. When fine-positioning is required, it is feasible to realize an adjustment operation of the highest precision by statically exciting the piezoelectric stacks 1, 2 in a push-pull mode, in accordance with the embodiment of FIG. 1.

Figure 3:
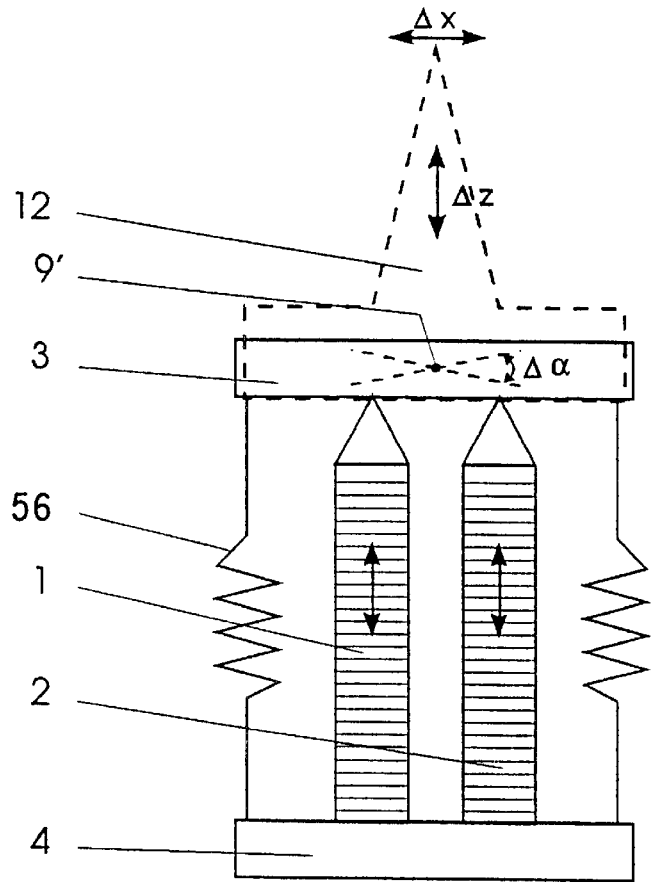
FIG. 3, a schematic view of another embodiment of the present invention.

Referring to FIG. 3, a further embodiment of the present invention produces a lift (Δz) in the z-direction at φ=0°, and a tilting (Δα) of the arm 3 about a fulcrum 9' with φ=180°. The tilting can be changed into a translatory movement (Δx) in the x-direction by substitution of a lever arm 12 indicated in dashed lines. The advantage of such an embodiment lies in adjustability of transmission in the x-direction via varying a length of the lever arm 12 and in an effective low mass to be moved which permits still greater reaction speeds than obtainable with the embodiments of FIGS. 1 and 2. It is also feasible to angularly embody the lever arm 12 when there is no lift required.

Figure 4:
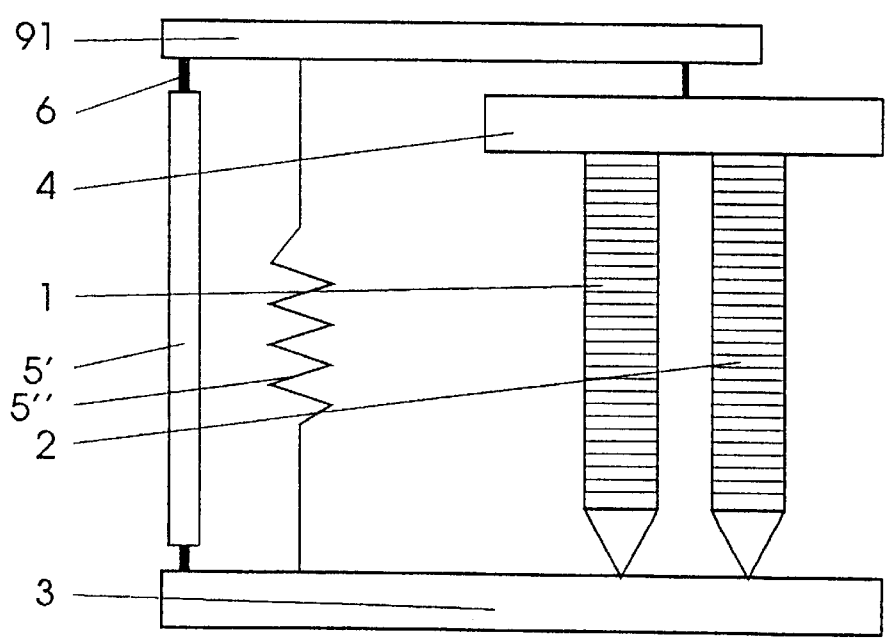
FIG. 4, a schematic view of another embodiment of the present invention in which a symmetrical pre-tensioning force is executed by asymmetrically arranged means.

Referring to FIG. 4, a different feasible arrangement of the present invention has the symmetrical application of the pre-tension to both piezoelectric stacks 1, 2 implemented by means of asymmetrically applied tension and compression means 5', 5". The installation of, for example, solid state joints 6 in a laterally arranged pressure rod 5' ensures the lateral deflection of the arrangement as referred to in FIG. 1. It is feasible to arrange additional drive members (not shown in detail) on, for example, a cross bar 91.

Figure 4A:
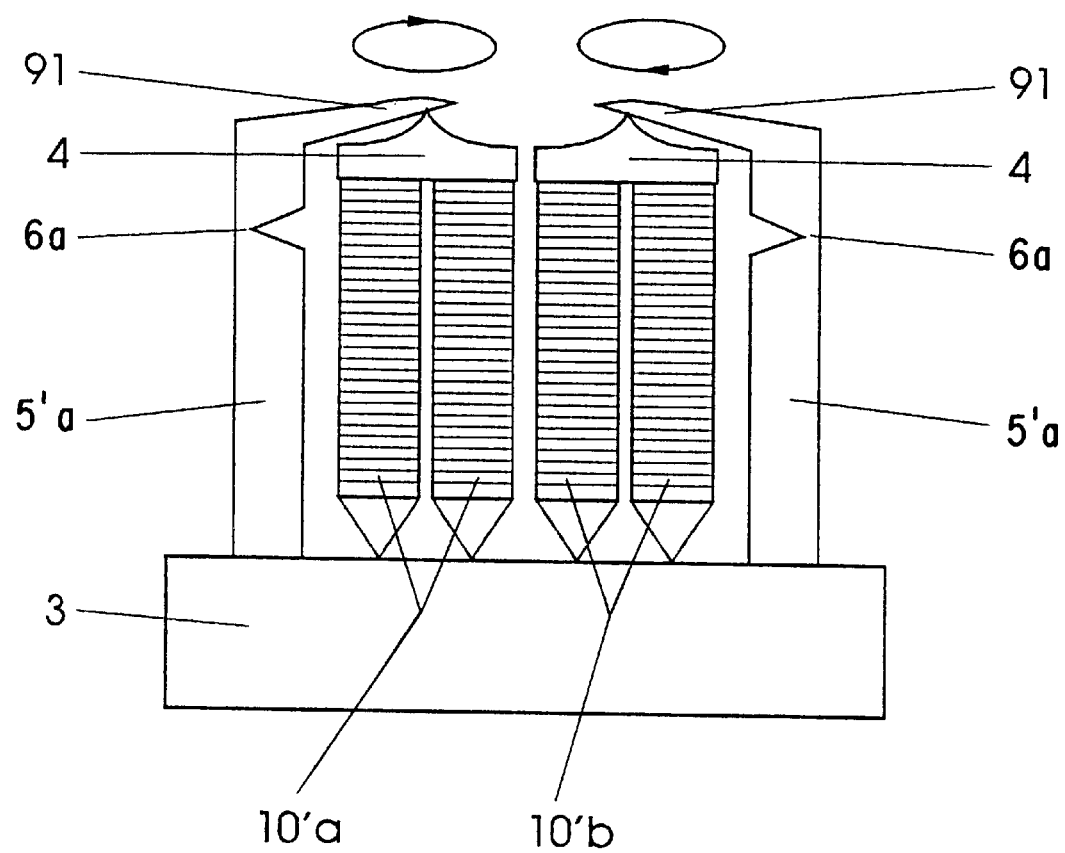
FIG. 4a, a schematic view of another embodiment of the present invention incorporating the embodiment of FIG. 4 and having a mirror symmetrical arrangement of two units.

Referring to FIG. 4a, an embodiment in accordance with FIG. 4 permits a particularly space- and mass-saving setup of the power generating and tilting means as well as of the cross bar 4 and, hence, ensures very high reaction speeds. Quiet running of the entire device is achieved by providing a mirror-symmetrical arrangement having narrowly adjacent coupling points as schematically shown in FIG. 4a wherein a push-pull operation of two pairs of stacks 10'a and 10'b is realized with the use of solid state flexing joints 6a, tension bars 5'a and the cross bars 4.

Figure 5:
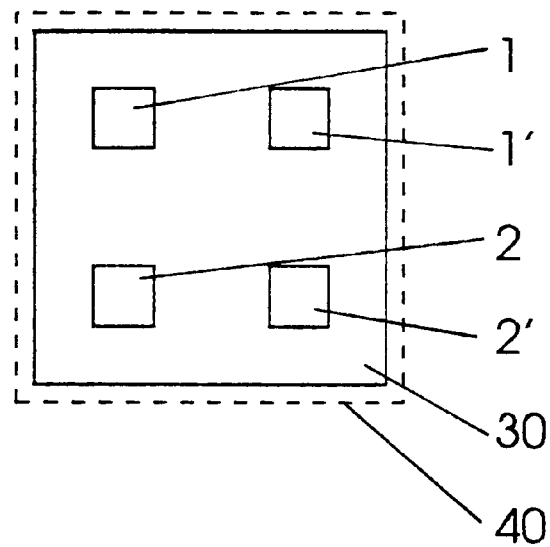
FIG. 5, a schematic plan view of another embodiment of the present invention employing four piezoelectric stacks.

Referring to FIG. 5, a schematic plan view shows an arrangement having, in contrast to the above described arrangements, four piezoelectric stacks 1, 1', 2, 2', rather than two, which do not contact one arm 3 but press upon an arm plate 30. The piezoelectric stacks 1, 1', 2, 2' are distributed in a square. Depending on whether such an arrangement is secured to displace a cross plate 40 or to an arm plate 30, two-dimensional x-y-displacements are produced in analogy to one-dimensional x-displacements represented in FIGS. 2 and 3, respectively, or two dimensional tiltings about the x- and y-axes result which, if required, can be converted into an xy-displacement by a not shown lever similar to the lever 12 shown in FIG. 3. Such movements can be combined with respective lifts in the z-direction by a respective excitation described above with reference to FIGS. 2 and 3 . Such a four-stack arrangement is extremely compact and can replace, as described hereinafter, an x-y displacement drive constituted of two orthogonally connected arrangements which are each operative only one-dimensionally. However, the plate-sided tilting means for the single stack coupling has to be embodied in such a manner that more than one degree of freedom is feasible. This can be achieved, for example, by a tone-shaped or preferably a mushroom head coupling element, particularly executed as a solid state joint.

Figure 6:
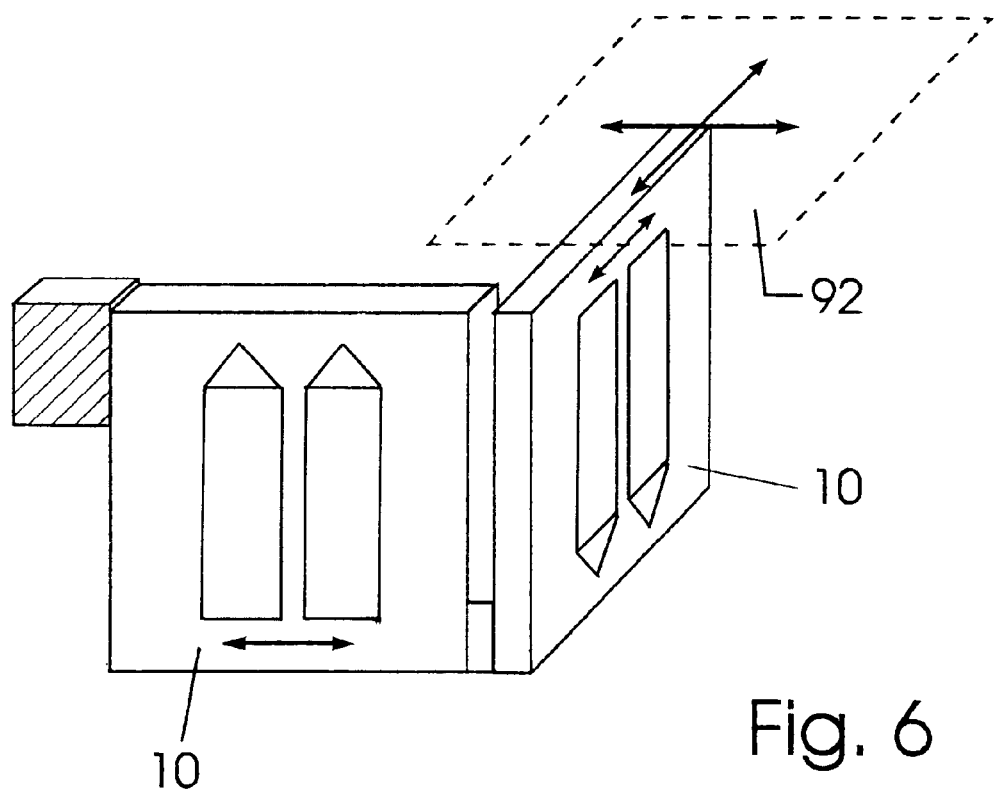
FIG. 6, a schematic view of another embodiment of the present invention which permits displacements in several directions of coordinates using drive elements of the type shown in FIG. 1.

Referring to FIG. 6, a combination of two the drive actuators 10 are non-displaceably connected with one another via one of their sides so that their work directions are coupled it right angles to one another to form an x-y displacement drive for a table 92 indicated by dashed lines. Though somewhat bulky compared to the arrangement of FIG. 5, the electric circuitry for driving the stacks is easily implemented. The arrangement of FIG. 6 may be further extended to realize an x-y-z-displacement drive by including a third one of the drive actuator 10 having working direction orthogonal to the other two of the drive actuators 10.

Figure 7:
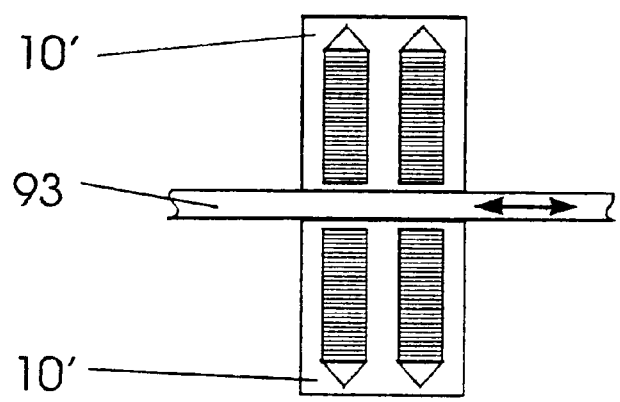
FIG. 7, a schematic view of another embodiment of the present invention showing a modification of a linear drive setup with two drive elements of the type shown in FIG. 2.

Referring to FIG. 7, a further embodiment of the present invention provides a step drive having a plurality of the drive actuators 10. Two of the drive actuators 10 are disposed in 180° opposition to one another and arranged in a common plane. When identical voltage curves are symmetrically applied across both elements, the drive actuators 10 simultaneously act on a driven element 93 such that the coupling forces acting upon the driven element 93 compensate mutually to provide advantages including precise coupling and decoupling at a low lift, no resonance excitation of the driven element 93 to be displaced, and low expenditures for seating and guiding.

Instead of the schematically indicated drive actuators 10, the present embodiment permits the application of the drive actuator according to FIG. 4a wherein the dual stack pairs 10'a and 10'b are arranged on a common base and operate in the push-pull mode. Hence, with a setup according to FIG. 7, one of the dual stack pairs 10'a and 10'b always remains coupled in the push-pull mode with respect to the driven element 93 while another couple of the dual stack pairs 10'a and 10'b executes a reset movement. In this embodiment the base is far more uniformly loaded and only such tilting forces arise which can be compensated by a parallelogram connection to a housing.

Figure 8:
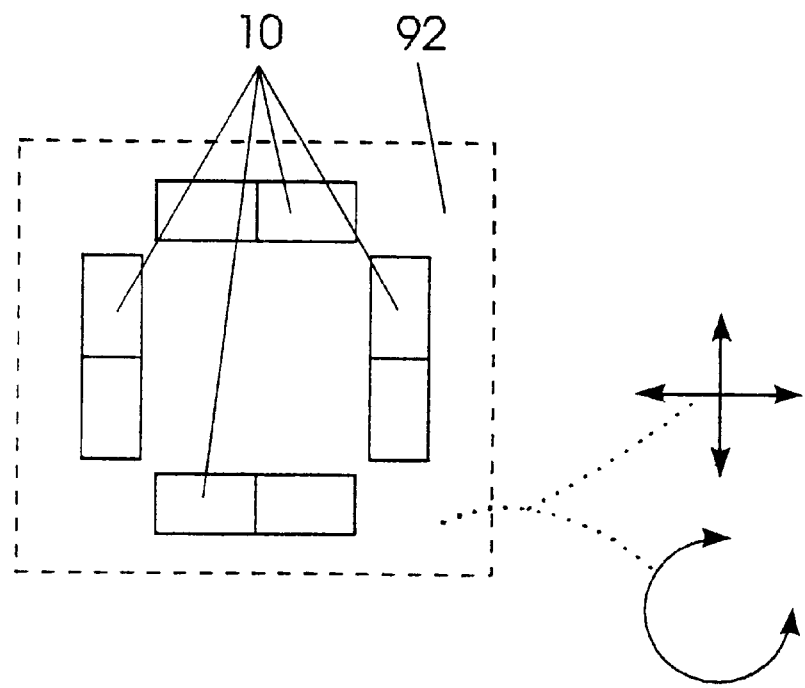
FIG. 8, a schematic plan view of another embodiment of the present invention for displacing and rotating.

Referring to FIG. 8, a schematic plan of another embodiment shows individual ones of the drive actuators 10 arranged in parallel pairs which, in turn, are at right angles to respective further parallel pairs. On the one hand, it is feasible to excite the individual drive elements 10 in the same direction via the voltage curves only in opposing pairs so that either a successive or a parallel x-y-displacement of a positioning table 92 is feasible, indicated by dash-lines. On the other hand, a respective paired oppositely directed excitation of opposing individual ones of the drive actuators 10 is possible so that the table 92 is rotated. The respective directions of movement are indicated by a double arrow.

Figure 9:
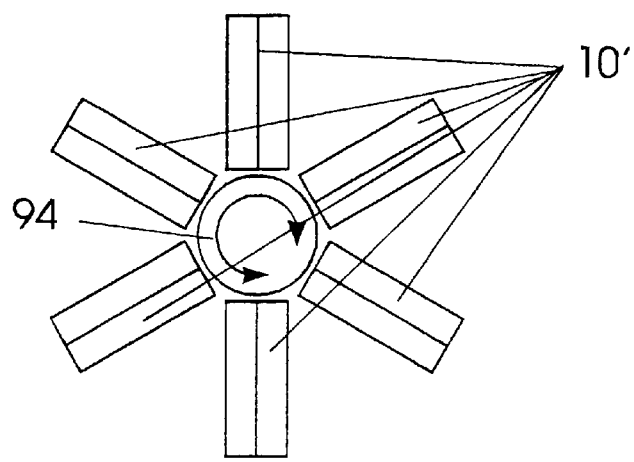
FIGS. 9 and 10, schematic views of further embodiments of the present invention for a rotational drive of a shafts and hollow cylinders, respectively, using drive elements of the type shown in FIG. 2.
Figure 10:
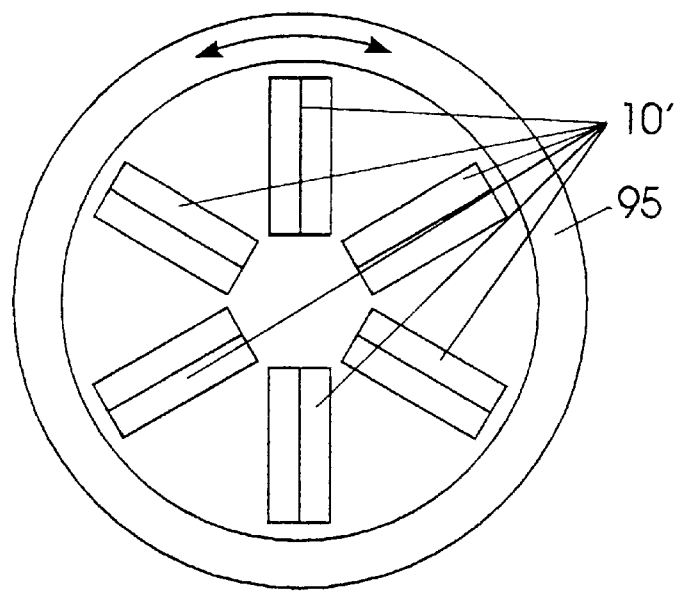

Referring to FIGS. 9 and 10, other embodiments have a plurality of the drive actuators 10' of the second embodiment acting on an external face of a shaft 94, as shown in FIG. 9, or on an interior wall of a hollow cylinder 95, as shown in FIG. 10, realizing a step drive for rotational movements. The number of the drive actuators 10' to be applied and, hence, the obtainable clamping force, is easily adapted according to the torque required. Also the electric excitation of all the drive actuators 10' with respect to step width and to a relative time sequence is selectable at will to obtain, for example, an optimum characteristic.

In the above described embodiments, for a given kind of mounting of the stack pairs, the displacement path to be obtained depends on the size of the counter force. When the counterforce exceeds the so-called clamping force, the displacement path becomes zero. Furthermore, a piezoelectric actuator according to the present invention is not capable of producing power at the end of its maximum lift. However, precisely manufactured piezo stacks exhibit a very high self-rigidity and, nevertheless, produce clamping forces on an order of size of 2 kN at a structure height of 20 mm and at a cross-section of 8×8 mm$^2$. Thus the actually executable lift for each actuator type depends on the special conditions of the application at a given excitation voltage.

The features disclosed in the specification, in the attached claims, and in the drawings are essentially for the present invention, individually and in any combination.

We claim:

1. A piezoelectric drive, comprising:
   at least two piezoelectric members that are expandable and contractible in a first direction and are disposed adjacent and parallel one another, said at least two piezoelectric members each having a first end face and a second end face opposing one another in said first direction;

a base member;

said at least two piezoelectric members each having tiltable connections at said first end faces tiltably connecting said first end faces to said base member a fixed distance apart, a cross member;

said second end faces of said at least two piezoelectric members being rigidly connected to said cross member a fixed distance apart to rigidly connect said at least two piezoelectric members via said second end faces;

coupling means for coupling said cross member to said base member and permitting displacement of said cross member relative to said base member in said first direction and a second direction perpendicular to said first direction in response expansion and contraction of said at least two piezoelectric members; and said coupling means including a biasing means for biasing said cross member toward said base member in said first direction to exert force symmetrically on said at least two piezoelectric members.

2. The piezoelectric drive as claimed in claim 1, wherein said tiltable connections are solid state joints.

3. The piezoelectric drive as claimed in claim 1, wherein said coupling means is disposed asymmetrically with respect to said at least two piezoelectric members and includes a lever arm via which said biasing means exerts force on said cross member and said at least two piezoelectric members.

4. The piezoelectric drive as claimed in claim 1, wherein said coupling means includes springs symmetrically arranged relative to said at least two piezoelectric members and said springs function as said biasing means to exert force on said cross member and said at least two piezoelectric members.

5. The piezoelectric drive as claimed in claim 1, 2 or 3, wherein said coupling means includes a solid state joint forming a point of contact on said cross member to exert said force symmetrically on said second end faces via said cross member.

6. The piezoelectric drive as claimed in claim 1, wherein said coupling means is a parallelogram structure.

7. The piezoelectric drive as claimed in claim 1, wherein said biasing means includes tension rods symmetrically disposed relative to said at least two piezoelectric members.

8. The piezoelectric drive as claimed in claim 1 or 3, wherein said biasing means includes a compressed member under compression and a tensioned member under tension cooperatively disposed to exert said force upon said two piezoelectric stacks wherein said compressed member and said tensioned member are asymmetrically disposed relative to said at least two piezoelectric members.

9. The piezoelectric drive as claimed in claim 1, further comprising voltage generator means for applying voltages respectively across said at least two piezoelectric stacks with said voltages being variable in time and with respect to one another.

10. The piezoelectric drive as claimed in claim 9, wherein said voltage generator means generates said voltages such that said voltages each include a d.c. voltage and an a.c. voltage and a phase-shift between said a.c. voltages is variably adjustable in a range from 0° to 360°.

11. The piezoelectric drive as claimed in claim 9, wherein said voltages include a d.c. voltage having a mean value which is kept constant and a difference voltage subject to a variation.

12. The piezoelectric drive as claimed in any one of claims 1 to 4, 6, 7 and 9 to 11, wherein said at least two piezoelectric members include four piezoelectric members disposed with said first end faces defining a square and said second end faces defining a square.

13. The piezoelectric drive as claimed in claim 12, wherein said tiltable connections connecting said four piezoelectric members to said base member are one of cone-shaped and mushroom-shaped permitting tilting of said four piezoelectric elements with more than one degree of freedom.

14. A piezoelectric drive apparatus, comprising:

piezoelectric drive assemblies each including:

at least two piezoelectric members that are expandable and contractible in a first direction and are disposed adjacent and parallel one another, said at least two piezoelectric members each having a first end face and a second end face opposing one another in said first direction;

a base member:

said at least two piezoelectric members having tiltable connections at said first end faces tiltably connecting said first end faces to said base member a fixed distance apart;

a cross member;

said second end faces of said at least two piezoelectric members being rigidly connected to said cross member a fixed distance apart to rigidly connect said at least two piezoelectric members via said second end faces;

coupling means for coupling said cross member to said base member and permitting displacement of said cross member relative to said base member in said first direction and a second direction perpendicular to said first direction in response expansion and contraction of said at least two piezoelectric members; and said coupling means including a biasing means for biasing said cross member toward said base member in said first direction to exert force symmetrically on said at least two piezoelectric members;

a common driven member; and said piezoelectric drive assemblies each having one of said cross member and said base member coupled to said common driven member.

15. The piezoelectric drive apparatus as claimed in claim 14, wherein said at least two piezoelectric members of each of said piezoelectric drive assemblies are a pair of piezoelectric members and said piezoelectric drive assemblies are disposed in a linear arrangement, and said piezoelectric drive apparatus further comprises voltage generating means for applying identical voltages symmetrically and in common mode across said at least two piezoelectric members of said piezoelectric drive assemblies.

16. The piezoelectric drive apparatus as claimed in claim 14, wherein said at least two piezoelectric members of each of said piezoelectric drive assemblies are a pair of piezoelectric members and said piezoelectric drive assemblies are disposed in a linear arrangement, and said piezoelectric drive apparatus further comprises voltage generating means for applying identical voltages asymmetrically and in push-pull mode across said at least two piezoelectric members of said piezoelectric drive assemblies.

17. The piezoelectric drive apparatus as claimed in claim 14, wherein said at least two piezoelectric members of each of said piezoelectric drive assemblies are a pair of piezoelectric members and said second direction lies in a plane defined by said pair of piezoelectric members, said piezoelectric drive assemblies are disposed with respective ones of said second directions thereof in an orthogonal arrangement with respect to one another, and said first directions of each of said at least two piezoelectric members of each of said piezoelectric drive assemblies are in parallel to one another when said piezoelectric drive assemblies are at rest.

18. The piezoelectric drive apparatus as claimed in claim 14, wherein said at least two piezoelectric members of each of said piezoelectric drive assemblies are a pair of piezoelectric members and said second direction lies in a plane defined by said pair of piezoelectric members, said piezoelectric drive assemblies are disposed with respective ones of said second directions thereof in an orthogonal arrangement with respect to one another, and said first directions of respective ones of said piezoelectric drive assemblies are perpendicular to one another when said piezoelectric drive assemblies are at rest.

19. The piezoelectric drive apparatus as claimed in claim 18, wherein said pairs of piezoelectric member are, in one dimension, individually secured to one another.

20. The piezoelectric drive apparatus as claimed in claim 14, wherein said piezoelectric drive assemblies are radially arranged about said common driven drive member to rotate said common driven drive member.

21. The piezoelectric drive as claimed in claim 1, wherein said coupling means includes solid state joints effecting tiltable connections to said base member and said cross member.

22. The piezoelectric drive as claimed in claim 2, wherein said coupling means includes solid state joints effecting tiltable connections to said base member and said cross member.

23. The piezoelectric drive as claimed in claim 6, wherein said parallelogram structure includes said base member, a top arm member and two side members tiltably connected to said base member and said top member, and said top member is pivotally coupled to said cross member with said cross member and said at least two piezoelectric members being disposed between said base member and said top arm member.

24. The piezoelectric drive as claimed in claim 23, wherein said biasing means are incorporated into said side members.

* * * * *